United States Patent [19]

Ausnit

[11] Patent Number: 4,848,928
[45] Date of Patent: Jul. 18, 1989

[54] PACKAGE WITH RECLOSABLE FIN AND METHOD

[75] Inventor: Steven Ausnit, New York, N.Y.

[73] Assignee: Minigrip, Inc., Orangeburg, N.Y.

[21] Appl. No.: 42,842

[22] Filed: Apr. 27, 1987

[51] Int. Cl.$^4$ .............................................. B65D 30/00
[52] U.S. Cl. ............................................ 383/5; 383/63;
383/65; 206/459; 206/605; 206/610; 206/632
[58] Field of Search ............... 385/5, 63, 65; 206/459,
206/605, 610, 632, 621

[56] References Cited

U.S. PATENT DOCUMENTS

| | | | |
|---|---|---|---|
| 3,827,472 | 8/1974 | Uramoto | 383/63 |
| 4,252,238 | 2/1981 | Spiegelberg et al. | 383/63 |
| 4,285,376 | 8/1981 | Ausnit | 383/63 |
| 4,570,820 | 2/1986 | Murphy | 383/63 |
| 4,589,145 | 5/1986 | Van Erden et al. | 383/63 |
| 4,625,496 | 12/1986 | Ausnit | 53/541 |
| 4,646,511 | 3/1987 | Boeckmann et al. | 53/551 |
| 4,663,915 | 5/1987 | Van Erden et al. | 53/450 |
| 4,704,842 | 11/1987 | Boeckmann et al. | 53/450 |

*Primary Examiner*—Joseph Man-Fu Moy
*Attorney, Agent, or Firm*—Hill, Van Santen, Steadman & Simpson

[57] ABSTRACT

A tubular plastic container having moisture-proof capabilities and being reclosable with a continuous longitudinal seal along a back side, with cross-seals at the ends and with a front fold along the longitudinal front center formed by confronting faces being drawn together and folded over said front center with the confronting faces having internal continuous complementary interlocking rib and groove elements wherein the fold is severable for access to the rib and groove elements.

9 Claims, 2 Drawing Sheets

PACKAGE WITH RECLOSABLE FIN AND METHOD

BACKGROUND OF THE INVENTION

The present invention relates to improvements in containers, and more particularly to a plastic container having moisture-proof capabilities wherein a tubular container has a longitudinally extending rib and groove element thereon and is uniquely formed so that the container initially has integral material which is subsequently severable for access to the contents and to the rib and groove elements.

In the formation of containers, one form of container is generally in tubular form and is formed, filled and sealed on a form, fill and seal machine with flat continuous sheet material being supplied to the machine and containers being continuously completed and filled in a chain-like fashion with individual completed filled containers severed from the chain.

Such containers are frequently used for contents such as foodstuffs which must be sealed in a moisture-proof container so as to avoid contamination and to avoid drying out of the contents. Yet, in use it is desirable that such containers be reusable particularly in instances such as where they contain foodstuffs and only a portion of the foodstuffs may be consumed with each use so that if the container is reclosable, particularly in a sealed moisture-proof fashion, the utility of the container is substantially enlarged.

An expedient closure for such foodstuff packages is a rib and groove element which is generally a generic terminology for a fastener which is integral with the plastic sheet material and is closable by pressing the confronting faces together so that the rib enters the groove and joins it in a sealed fashion and where the rib and groove can be separated for reopening the package by pulling the confronting flaps apart. Such rib and groove elements may take various detailed forms as known by those versed in the art and as used herein will be merely referred to as rib and groove elements, it being understood that various structural arrangements may be employed.

In packaging materials and containers which are provided with reclosable rib and groove elements, it is desirable that the container initially be completely sealed so that it cannot be tampered with and the package will first be opened when placed in use by severing the material so as to provide access to the rib and groove elements and to the contents. This provides a package where a retailer can keep the package on the shelf without concern as to contamination of the contents or concern as to tampering. The purchaser who uses the container will merely sever the material when he places it into use and will then have a reopenable package which permits withdrawal of only a portion of the contents and resealing of the package.

It is accordingly an object of the present invention to provide a tubular reclosable package of the type which can be completed on a form fill machine, wherein the package is uniquely originally sealed by the material of the package remaining integral and the package can be placed in use by severing the material to obtain a reclosable container.

Another object of the invention is to provide a tubular package which can readily be formed in continuous fashion to have a chain of containers with individual containers cut from the chain.

A further object of the invention is to provide a unique container structure wherein the structure is initially integrally sealed by the material of the container being unbroken but the container is provided with a continuous rib and groove element extending longitudinally therealong accessible by cutting the material to provide a reclosable package.

A further object of the invention is to provide a form fill and seal type of package with a reopenable rib and groove feature uniquely arranged so that initially the container is completely sealed for moisture-proof and tamper proof integrity.

FEATURES OF THE INVENTION

It is desirable to provide a package wherein the opening is down the center of the package from the standpoint of having a package wherein the contents can be withdrawn from the center and the package can again be reclosed or resealed down the center. This is also advantageous in handling in a form fill machine.

A unique feature of the invention is the provision of a package which can be formed in a continuous process wherein the seal which closes the package extends longitudinally, the packages can be made sequentially and cutting off each formed package, and where the reopenable feature is independent of the longitudinal seal. In one form, the package is formed with a longitudinal seal extending down the center on one side of the package and a reopenable rib and groove element extends longitudinally on the opposite side of the package with the rib and groove element originally being protected by the layer of film which carries the rib and groove being continuous over the outside of the rib and groove. Another feature of the invention is the provision of a leak-proof package formed from a continuous layer of film wherein the end seals are formed so that the possibility of leakage out of the ends and at the ends of the rib and groove are eliminated.

The package of the invention is formed of a sheet of continuous plastic material preferably multi-layered for moisture-proof integrity wherein one of the layers may be of foil or all of the layers may be of laminated plastic film. The material for the package is formed of a continuous supply which has a longitudinally extending rib and groove therein with a unique fold being formed in the material to join the rib and groove so as to result in a flange along one side of the package which can be integral until the package is used and then severed so that the flange then has facing flaps which can be pulled apart to separate the rib and groove attached to the inside surface of each and said rib and groove reclosed by pressing them together. The tubular package has an integral welded seal along the back side with cross-seals at the ends and the back seal and the cross-seals are formed as the bag is being shaped, filled and sealed.

DESCRIPTION OF THE PREFERRED EMBODIMENTS

Figure 1:
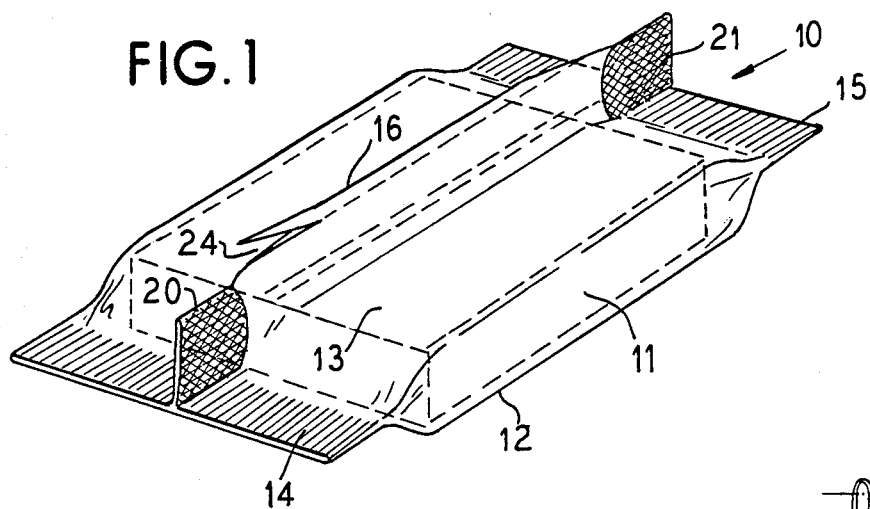
FIG. 1 is a perspective view of a container formed in accordance with the principles of the present invention.

As illustrated in FIG. 1, a tubular container 11 is shown formed of a plastic material. The container will be described with a generally flat panel side 12 as the back side and an opposite generally flat panel side 13 as the front side of the container and opposite ends 14 and 15, the sides 12 and 13 being joined integrally along longitudinal continuous edge portions of the container extending between the opposite ends 14 and 15.

At the top or front side 13 is an upwardly extending flange 16 formed of a fold of the material and the fold or flange 16 is welded at its ends 20 and 21 and will form a T in any laminated structure, since the outer layer of laminate type films will not normally weld to each other.

Figure 3:
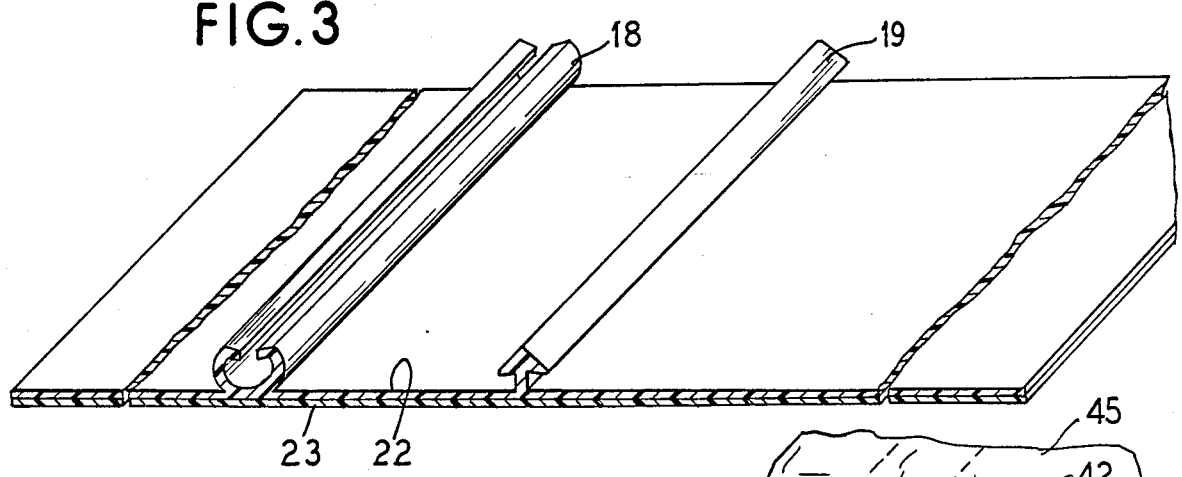
FIG. 3 is an enlarged fragmentary illustration of the material of the container with the rib and groove fasteners thereon.

The container is formed of a continuous sheet of film preferably multi-layered so as to be laminated with the layers illustrated at 22 and 23 in FIG. 3. The inner layer 22 is of extruded plastic and has a continuous longitudinally extending groove element 18 extending therealong with a parallel spaced rib element 19 extending therealong. The inner layer 22 may be of polyethylene or EVA which readily seal to each other and the outer layer 23 of mylar, polyester, metallic foil or other desirable material for packaging depending upon the use and contents, and which layers generally do not seal to each other. The contents may be foodstuffs, for example, such as cheese wherein moisture must be retained within the container.

Figure 2:
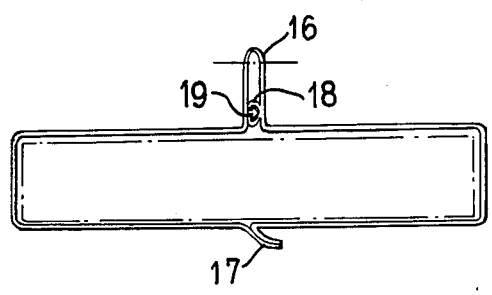
FIG. 2 is a vertical sectional view taken through the container of FIG. 1 particularly illustrating the flange along one side which provides the reopenable capabilities for the container.

Along the front side, the material is drawn up into a confronting fold to form a doubled edge such as shown at 16 in FIG. 2 with the rib and groove elements pressed together and interlocked. In the formation of the continuous container, the edges of the film are brought together in confronting flange relation into a pin seal 17 and said edges are welded in face-to-face relationship. If the inner layer of material is of a sealable plastic, such welding can be readily accomplished by the application of heat t join the plastic. The weld will generally be formed by heat or other satisfactory joining method. The cross-seals at the ends of the package such as illustrated at 14 and 15, and the spot seals 20 and 21 at the ends of the fasteners may be similarly formed by the application of a knurled heated bar or by ultrasonic welding or other suitable package welding equipment.

Figure 4:
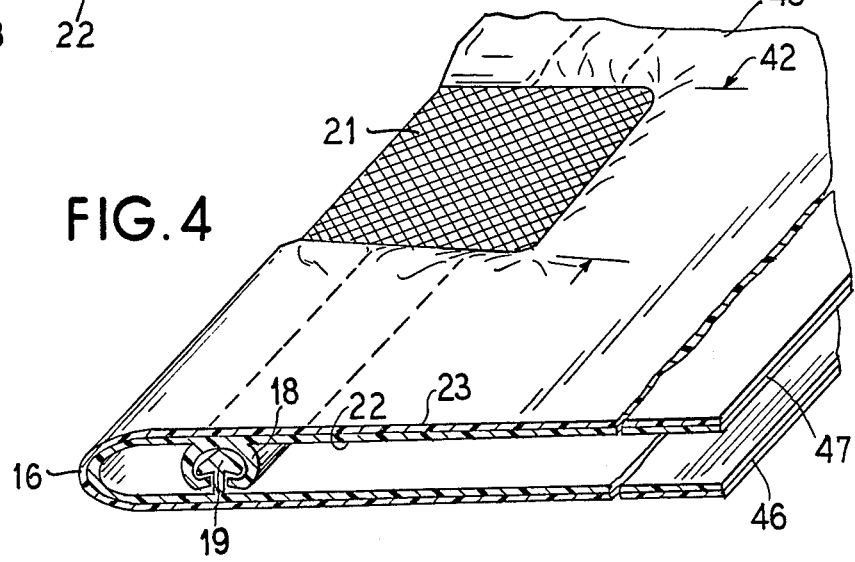
FIG. 4 is a fragmentary enlarged illustration showing the spot seal formed at the end of the package to press together the ends of the rib and groove elements.

FIG. 4 illustrates a step in the series of forming the package. A continuous strip of packaging material 45 is provided, preferably multi-layered with the inner layer 22 being of a plastic such as polyethylene and the outer layer 23 being a barrier material such as foil. The interlocking elements 18 and 19 are interlocked and a broad spot seal 21 is formed flattening the rib and groove elements. The spot seal has a width 42 measured in the direction of the film length. The spot seals 21 are shown at 20 and 21 in the finished package in FIG. 1.

Figure 7:
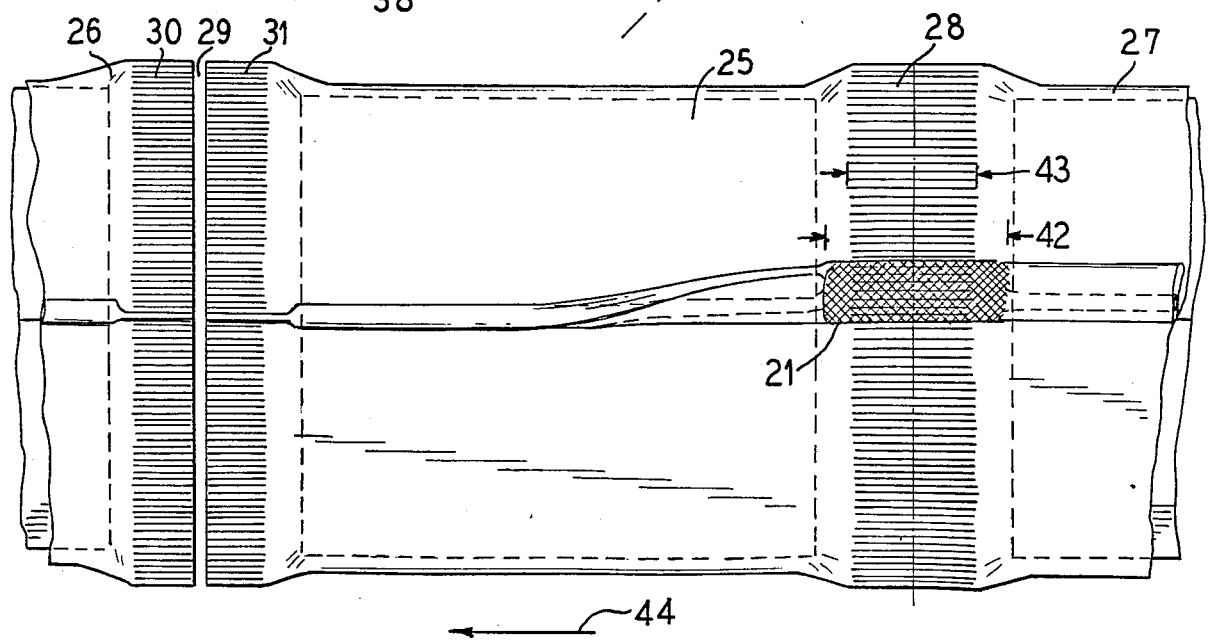
FIG. 7 is a plan view illustrating the formation of a series of containers showing the method embodying what is shown in FIG. 4.

In the process of manufacture of the packages, the material is fed forwardly in the general direction of the arrowed line 44 shown in FIG. 7 and the spot seal 21 is flattened as a cross end seal 28 is formed. The spot seal can be applied either before or after the formation of the fold. The cross seal 28 is formed such as by pressing with a heated knurled bar and the broad end seal 28 will serve the two adjoining packages. The end seal has a width 43 which is less wide than the width 42 of the spot seal.

The relationship in width differential is significant, since end seal 28 can only be satisfactorily provided if the spot seal 21 has previously been made and has reduced to an acceptable level the much greater thickness of the profile. Additionally, the width of the spot seal 21 has to be greater than the width of the end seal, so as to prevent any leakage through the profile end, and provide the integrity of the package, particularly where the outer layers of the film of the package are of non-sealable material and hence will stand up as soon as, or shortly after the package is handled. If, however, a material is used so that the outside layer 23 is of a sealant material such as a thermoplastic, then the spot seal will remain adhered down. This can occur also without adversely affecting the rib and groove elements.

After the cross-seal has been formed as shown in FIG. 7, the packages are moved forward and a lateral cut 29 is formed to separate two packages 25 and 26. After the cross-seal 28 is made, another cut will be made at the center of this cross-seal to separate the packages 25 and 27.

Figure 6:
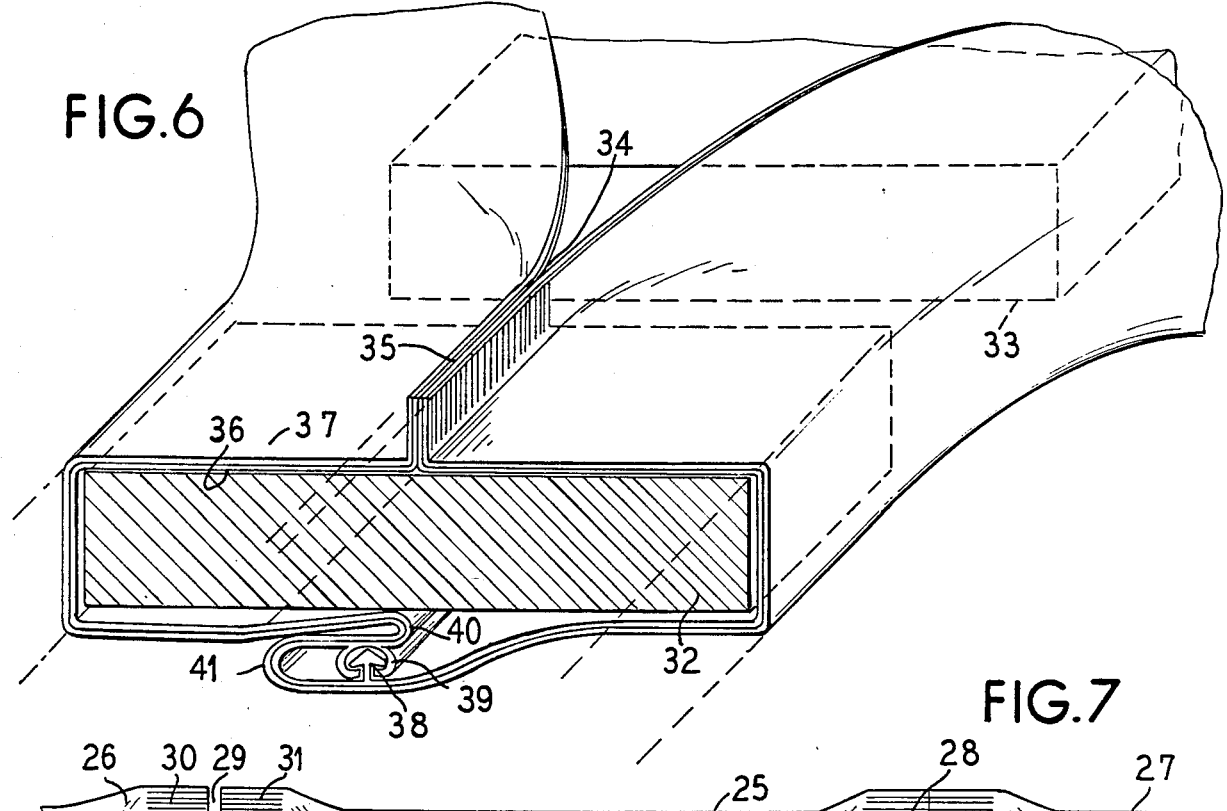
FIG. 6 is a perspective view illustrating the manner in which the container is formed and filled.

Prior to the formation of the cross-seals 28 and severing of the individual bags, or simultaneously therewith a fin seal is formed on the opposite side of the package, that is opposite the reclosable closure. This fin seal is shown in FIG. 6 at 35 and in FIG. 2 at 17. It is formed by bringing the free edges of the film shown at 46 and 47 in FIG. 4, together in face-to-face relationship and sealing them together such as by heat sealing or by an adhesive. Thus, a fin seal can be formed which is fully secure and optimum for a final and thorough seal, and which does not interfere with the use of the bag when it is to be opened on the opposite side and to be reclosed and used with employment of the rib and groove reclosable elements.

The completed containers are fully sealed and when the user and purchaser desires to use a container, he cuts a strip from the edge as shown by the cut 24 in FIG. 1 to provide access to the rib and groove elements and by pulling the freed edges of film formed by the cut 24 apart, the rib and grooves are separated for access to the contents within the container. The bag or container can then be reclosed by pressing the rib and groove elements together for a serviceable reusable container.

Figure 5:
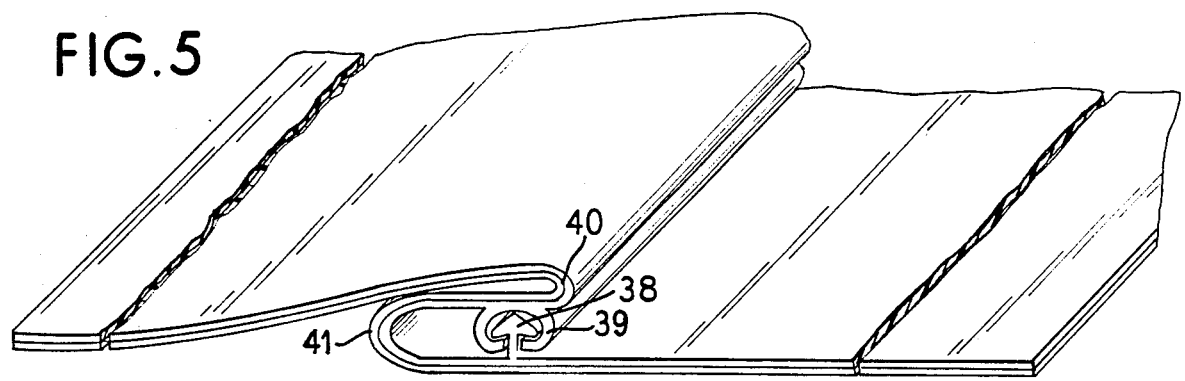
FIG. 5 is a fragmentary perspective view of an arrangement for the fastener extending along the front face of the container.

The arrangements shown in FIGS. 5 and 6 illustrate how the unique fold mentioned earlier is formed by doubling the film material to form an external fold 41 and simultaneously forming an internal fold 40. In the arrangement of FIG. 5 and 6, the plastic material carrying the rib and groove is externally of the package contents. The fold is formed prior to the time that the package is completed and spot seals 21 are formed at predetermined intervals either before or after the forming of the fold.

When the user wishes to have access to the contents of the bag, as shown in FIG. 6, he severs the external fold 41 and then uses the flaps created thereby to pull apart the rib 38 and groove 39 elements to gain access to the inside of the package. To reclose the package the rib and groove are pressed together to interlock. The internal fold 40 allows the material to be manufactured with the rib and groove on the same surface, i.e., the inner surface of the material. The unique inner fold 40 allows this arrangement to be flat against the package.

Thus, it will be seen there has been provided a unique arrangement whereby containers can be formed in a continuous rapid manufacturing operation and the resultant containers are fully sealed yet provide a reopenable feature. The reopenable and reclosable feature is attained without in any way sacrificing an originally fully sealed container and the arrangement can be utilized with an upstanding flange fold arrangement or a flat fold arrangement.

I claim as my invention:

1. A plastic container having moisture-proof capabilities and being reclosable, comprising in combination:
   a tubular container formed of plastic material;
   an integral impervious fold of material extending longitudinally along a generally flat front side of said container and formed by drawing confronting faces together and folding them over said front side with said confronting faces having interior continuous complementary releasibly interfacing rib and groove members longitudinally therealong whereby the edge of the fold can be severed for access to said rib and groove elements to reclosably open said front side of the container;
   cross-seals at opposite ends of the container;
   and a longitudinal fin seal extending along a generally flat back side of the container and opposite said fold.

2. A plastic container having moisture-proof capabilities and being reclosable constructed in accordance with claim 1:
   wherein said fold is sealed at the ends of the container by the confronting faces being welded to each other.

3. A plastic container having moisture-proof capabilities and being reclosable constructed in accordance with claim 1:
   wherein said plastic material is of multiple layers laminated to each other.

4. A plastic container having moisture-proof capabilities and being reclosable constructed in accordance with claim 3:
   wherein the laminate layers include a layer of metal foil.

5. A plastic container having moisture-proof capabilities and being reclosable constructed in accordance with claim 1:
   wherein the inner surface of the container is of heat weldable plastic and said cross-seals at the ends are formed by welding said plastic.

6. A plastic container having moisture-proof capabilities and being reclosable constructed in accordance with claim 1:
   wherein said container is formed in a series with each container of identical construction and the individual containers separated by cutting across an intermediate portion of said cross-seals at the ends.

7. A plastic container especially adapted to be formed, filled and sealed on a form, fill and seal machine and having moisture-proof capabilities and being reclosable, comprising in combination:
   a tubular container formed of a unitary sheet of plastic material and having opposite flattened panels joined integrally along longitudinal edges of the container;
   a fin seal spaced from both of said container edges and joining longitudinally extending edges of the sheet of material along one of the panels which provides a back side of the container;
   and a fold extending longitudinally along a mid portion of the other panel which provides a front side of the container with the fold having confronting faces with rib and groove elements thereon so that the edge of the fold can be severed for opening the container permitting the rib and groove elements to be separated and reclosed in use of the container.

8. A plastic container having moisture-proof capabilities and being reclosable constructed in accordance with claim 7:
   including flat seals at the ends of the container and a spot seal at the ends of said fold sealing the ends of said rib and groove elements and joining the end seals.

9. A plastic container having moisture-proof capabilities and being reclosable constructed in accordance with claim 7:
   wherein the width of said spot seal in the direction of the bag length is wider than the end seal.

* * * * *